United States Patent
Labrozzi et al.

(10) Patent No.: US 11,128,688 B2
(45) Date of Patent: Sep. 21, 2021

(54) TRANSCODER CONDITIONING FOR SEGMENT FLUIDITY

(71) Applicant: Disney Enterprises, Inc., Burbank, CA (US)

(72) Inventors: Scott C. Labrozzi, Cary, NC (US); William B. May, Jr., Sunnyvale, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/654,761

(22) Filed: Oct. 16, 2019

(65) Prior Publication Data
US 2021/0120061 A1 Apr. 22, 2021

(51) Int. Cl.
H04L 29/06 (2006.01)
H04N 19/114 (2014.01)
H04N 19/142 (2014.01)
H04N 19/172 (2014.01)
H04N 19/177 (2014.01)

(52) U.S. Cl.
CPC ........ H04L 65/607 (2013.01); H04L 65/4084 (2013.01); H04L 65/80 (2013.01); H04N 19/114 (2014.11); H04N 19/142 (2014.11); H04N 19/172 (2014.11); H04N 19/177 (2014.11)

(58) Field of Classification Search
CPC ... H04L 65/80; H04L 65/607; H04L 65/4084; H04N 19/114; H04N 19/142; H04N 19/172; H04N 19/177
USPC .......................................... 709/231
See application file for complete search history.

(56) References Cited

U.S. PATENT DOCUMENTS

| 2011/0268178 | A1 | 11/2011 | Park et al. |
| 2013/0064283 | A1* | 3/2013 | Sun ................. H04N 21/23439 375/240.01 |
| 2013/0246643 | A1* | 9/2013 | Luby ................. H04N 21/8455 709/231 |
| 2017/0163708 | A1* | 6/2017 | Ramamurthy ........ H04L 65/607 |
| 2017/0289639 | A1 | 10/2017 | Reisner |

OTHER PUBLICATIONS

Easily perform facial analysis on live feeds creating a serveless video analytics environment using Amazon recognition video & Amazon Kinesis video etreams by Ben Snively Apr. 23, 2018.*
An effective algorithm for automatic detection and exact demarcation of Breadth sounds in speech and songs signals; pp. 838-850, by IEEE Feb. 20, 2007.*
European Patent Office for Application No. 20198918.3-1209 dated Feb. 11, 2020.

(Continued)

Primary Examiner — Frantz B Jean
(74) Attorney, Agent, or Firm — Patterson + Sheridan, LLP

(57) ABSTRACT

Embodiments provide for a system, comprising a plurality of encoders configured to generate a plurality of variant streams, and a cross-variant Instantaneous Decoder Refresh (IDR) identifier configured to inspect the plurality of variant streams, identify IDR frames in each of the plurality of variant streams, determine which IDR frames correspond to cross-variant boundaries, and demarcate the IDR frames corresponding to cross-variant boundaries.

18 Claims, 10 Drawing Sheets

(56) References Cited

OTHER PUBLICATIONS

OpenCable (TM) Specificiations Adaptive Transport Stream Specification, Feb. 14, 2014, X55188214.

Patnos R et al: "HTTP Live Streaming; draft-pantos-http-live-streaming-18.txt", Internet Engineering Task Force, Standardworkingdraft, Internet Society (ISOC) 4, Rue Des Falaises CH-1205, Geneva Switzerland, Nov. 19, 2015, pp. 1-49.

* cited by examiner

TRANSCODER CONDITIONING FOR SEGMENT FLUIDITY

BACKGROUND

A video format is a container that includes a data stream and metadata. The data stream may include a video stream and an accompanying audio stream. Metadata includes information about the video stream, such as the bitrate, resolution, and codec. The bitrate correlates to the quality of the video stream, while the resolution indicates the picture size of the video stream.

The codec is a system or program that encodes or decodes a data stream. An encoder is a system or program that implements the codec to encode a data stream while a decoder is a system or program that implements the codec to decode a data stream. Codecs are often used to compress data streams in order to reduce the size of video files for transfer over a computer network. Codecs may also be used to decompress data streams for media playback or data stream file manipulation.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
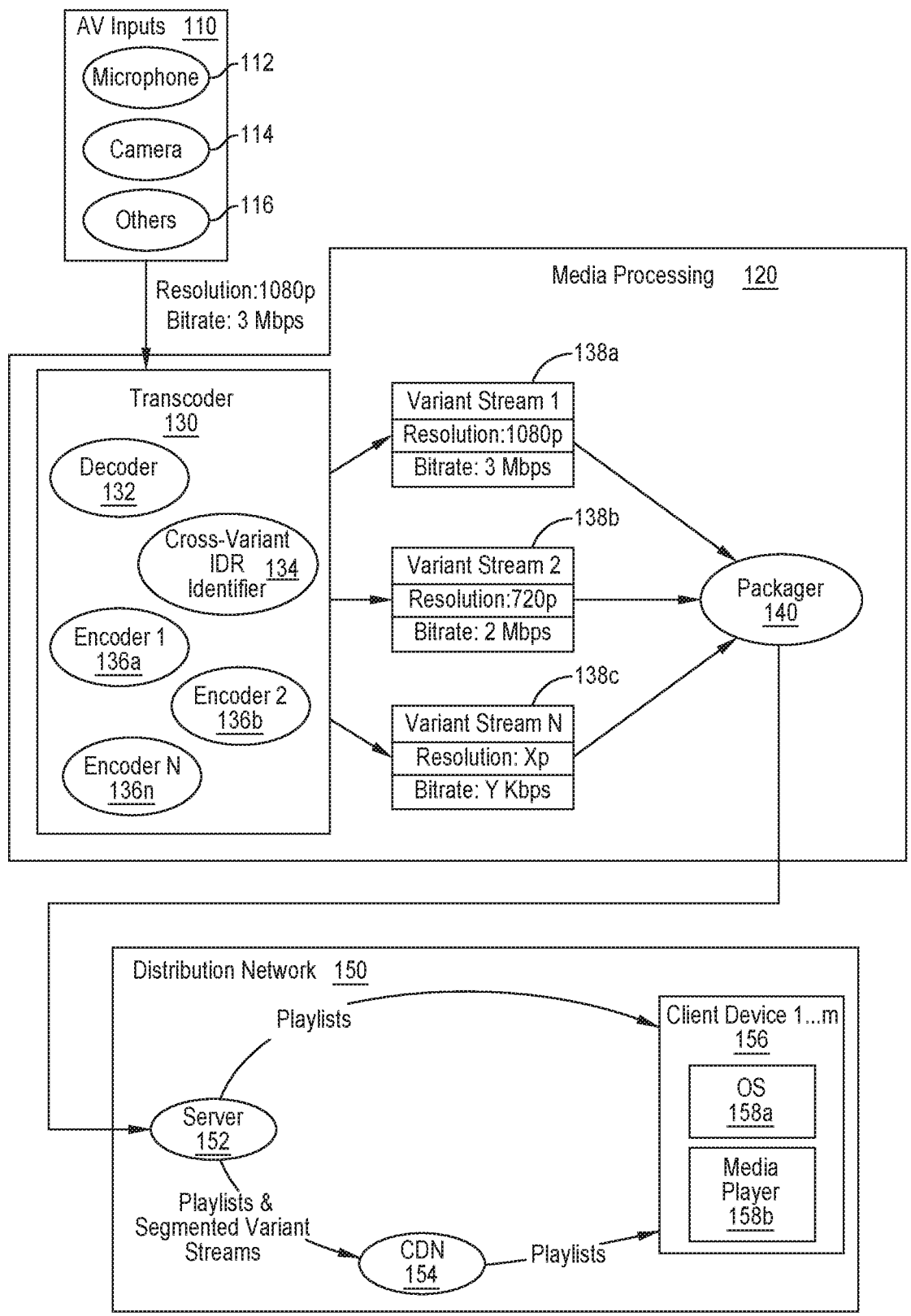
FIG. 1 illustrates a system for producing and delivering variant streams aligned across IDR frames, according to one embodiment.

So that features of the present disclosure can be understood in detail, embodiments of the present invention disclosed herein may reference HTTP Live Streaming (HLS) as the computer network streaming protocol. However, the disclosed embodiments should not be interpreted as being confined to any particular network protocol.

HLS is a computer network streaming protocol that can deliver media content via a master playlist. The master playlist references multiple variant streams, each of which includes a media playlist that references a collection of sequential segments of media content to be played in order by a client device.

Segments are identified in the media playlist by one or more Uniform Resource Identifiers (URIs) and, optionally, a byte-range. A URI is a string of characters that identifies a resource on the Internet.

Each segment in the media playlist begins at a segment boundary designated by an IDR frame, and ends at the frame immediately preceding the next segment boundary designated by an IDR frame. Segment boundaries are typically synchronized across the multiple variant streams. ABR is implemented by switching variant streams, thereby adjusting the streaming quality, at these aligned segment boundaries. Switching variant streams involves changing from a grouping of segments in one variant stream to a sequential grouping of segments in a different variant stream.

When recording a video, an audio-visual (AV) input produces an uncompressed data stream. An encoder compresses the video stream of the data stream into groups of pictures (GOPs) including I-frames, P-frames, and B-frames. Compressing the video stream allows for a smaller video file, which is easier to store and transfer across a computer network, as compared to storing and transferring larger video files.

A GOP is a set of sequential, compressed video frames whose boundaries are designated by I-frames. Each GOP begins with an I-frame (inclusive), but ends on a P-frame, or B-frame. Rendering the GOPs produces a display, or media playback, of the video content in the video stream.

A GOP may be open or closed. An open GOP includes at least one frame that is referenced by a frame in a previous GOP. A closed GOP includes only frame references within the present GOP. A closed GOP begins with an Instantaneous Decoder Refresh (IDR) frame.

An I-frame (also known as a key-frame or intra-frame) is a video frame that contains all of the video data in the frame necessary to fully display itself, without reference to another frame. Because an I-frame contains a full frame of video data, the I-frame is independently compressed by an encoder—that is, the I-frame is compressed without reference to other frames. Further, the I-frame serves as a reference for predicting one or more frames in the video stream. I-frames are generally larger than P-frames, which are generally larger than B-frames.

A P-frame (also known as a predicted frame) is a video frame that contains the video data that changed between the present P-frame and a previous I-frame or P-frame. That is, the P-frame excludes video data that is the same (redundancies) in the previous reference frame, but includes video data that is not the same in the previous reference frame. Hence, the present P-frame is encoded with reference to a previous !-frame or P-frame, and the present P-frame excludes the redundancies to reduce the storage size of the present P-frame. P-frames may serve as a reference for future P-frames, or any B-frame.

For example, if a video stream shows a person speaking in front of an unchanging backdrop, then a present P-frame may exclude information about the backdrop, which does not change from preceding reference frame to the present P-frame. The present P-frame may include information about the person's movement, which changes from the previous reference frame.

A B-frame (also known as a bidirectional frame) is a video frame that contains predictions of how one or more objects in the frame have changed across previous or subsequent I-frames, P-frames, or B-frames. Hence, unlike a P-frame, a B-frame can look both backwards and forwards to more types of reference frames in order to identify redundancies to exclude from the B-frame. An encoder predicts the difference between the present B-frame and the reference frames to reduce the storage size of the present B-frame.

An IDR frame is an I-frame that designates a frame reference barrier. The IDR frame cannot be referenced by frames from previous GOPs. Further, the IDR frame prevents frames in its own GOP from referencing frames that precede the IDR frame. That is, when a decoder encounters an IDR frame, the decoder designates all previous frames in a frame buffer as being disallowed for reference by any frame subsequent to the IDR frame. Hence, IDR frames are used to make the decoder refresh the frame buffer, thereby ensuring that the first frame in the GOP is always the IDR frame, and subsequent P-frames and B-frames will not reference any frame preceding the IDR frame. The frame reference barrier function of an IDR frame is not present in a non-IDR I-frame, which allows frames that reference the I-frame to also reference frames preceding the I-frame.

Beginning a GOP with an IDR frame may improve media playback, for example, at seek points. A seek point is a specific position in the media playback that is selected by the end-user of the media player.

When an end-user seeks to a point in the media playback, the seek point may fall on a P-frame or B-frame. Media playback may be unable to start at this location without producing distorted output because P-frames and B-frames do not contain enough video data to reconstruct a full image corresponding to the GOP containing the P-frames and B-frames. Instead, the media player must look to the I-frame referenced by the P-frames and B-frames to render the full image and begin playback of the present GOP.

Further, in adaptive bitrate streaming (ABR) based protocols (e.g., HLS), only IDR frames are viable variant stream switching points. ABR is a computer network streaming technique that involves measuring the network bandwidth and data throughput of a client device in real time, and switching variant streams to adjust the streaming quality delivered to the client device accordingly.

Variant streams represent different streaming bitrates for the same media content represented by the data stream. Generally, a higher streaming bitrate correlates to a greater streaming quality, while a lower streaming bitrate correlates to a lower streaming quality. Further, a higher streaming bitrate equates to an increased relative size of the data stream, while a lower streaming bitrate equates to a decreased relative size of the data stream. Hence, a higher quality stream requires more network bandwidth and greater data throughput of the client device to ensure continuous, uninterrupted media playback on the client device. Similarly, a lower quality stream requires less network bandwidth and less data throughput of the client device to ensure continuous, uninterrupted media playback on the client device.

Because a non-IDR I-frame allows subsequent frames to reference frames preceding the I-frame, if a seek results in the media player loading a different variant stream, then frames in the present variant stream may reference frames that existed in the previous variant stream, but do not exist in the present variant stream due to, for example, encoding differences such as differences due to the use of a scene change feature, as discussed below. These types of frame references can break media playback in ABR based protocols. The aforementioned issue is resolved by using IDR frames as the variant stream switching points, since IDR frames do not allow subsequent frames to reference frames preceding the IDR frame.

In the embodiments herein, a transcoder conditions video frames for downstream processing to create segments compatible for use with segment fluidity. Segment fluidity is a technique of grouping segments into resources so that different segment durations can be presented to different platforms or media players. A segment includes one or more GOPs.

FIG. 1 illustrates a system for producing and delivering variant streams aligned across IDR frames, according to one embodiment. In this embodiment, AV inputs 110 generate a video stream, and an encoder (not shown) compresses the video stream prior to delivery of the video stream to a transcoder 130. The encoded video stream includes a resolution and bitrate indicating its picture size and video quality, respectively. For example, the video stream may have a 1080p resolution and 3 Mbps bitrate.

The transcoder 130 is a processing entity that compresses and conditions a video stream for downstream processing. The transcoder 130 may include a decoder 132, one or more encoders, and a cross-variant IDR identifier 134. The decoder 132 may convert the video stream to its pre-encoded format, so that the encoders in the transcoder 130 can process the video stream. For example, a camera 114 may generate a video stream in a raw format. The camera 114 may have an integrated encoder (not shown) that converts the video stream into a first encoded format. A transcoder 130 downstream may be incompatible with the first encoded format. Hence, when the transcoder 130 receives the video stream in the first encoded format, a decoder 132 of the transcoder 130 may convert the encoded video stream into a raw format. An encoder in the transcoder may then convert the video stream into a second encoded format.

In one embodiment, the cross-variant IDR identifier 134 is a software module executed on hardware (e.g., a processor and memory). The cross-variant IDR identifier 134 may demarcate frames that the encoders use to condition variant streams for implementing segment fluidity. Alternatively, the cross-variant IDR identifier 134 may use metadata as an alternative to directly demarcating the video frames in the aforementioned manner. In yet another example, the cross-variant IDR identifier 134 looks across the variant streams, post-creation, to demarcate cross-variant aligned frames downstream as will be described in more detail below.

Each encoder in the transcoder 130 converts the decoded video stream into a variant stream. Each variant stream contains the same video stream (e.g., the same media content), but at a different bitrate. The transcoder 130 may also change the resolution of the video stream for each of the variant streams. For example, encoder 1 136a generates variant stream 1, which has a 1080p resolution and 3 Mbps bitrate; encoder 2 136b generates variant stream 2, which has a 720p resolution and 2 Mbps bitrate; and encoder N 136n generates variant stream N, which has an Xp resolution and Y Mbps bitrate. The variant streams include demarcations from the cross-variant IDR identifier 134 at segment boundaries that are aligned across the variant streams. The variant streams are delivered to a packager 140.

The packager 140 generates a playlist for each variant stream, and segments the variant streams at chosen demarcated frames. The packager 140 then delivers the playlists and variant streams to a distribution network 150. There, in one embodiment, the playlists and variant streams are directly sent to one or more servers 152. The playlists are then sent to client devices 156. The one or more servers 152 service any fetches/requests from the client devices 156 for segments of media content. That is, using the playlists, the client devices 156 can submit requests to the distribution network 150 for the segments identified in those playlists in order to play the media content therein.

Alternatively, the playlists and variant streams are directly sent to one or more servers 152. The playlists and variant streams are then sent to a content delivery network (CDN) 154, which delivers the playlists to the client devices 156 and services client devices' 156 fetches/requests for segments of the media content. In yet another example, the playlists and variant streams are first sent to a CDN 154, which delivers the playlists to the client devices 156 and services client devices' 156 fetches/requests for segments of the media content. Use of a CDN to service segments fetches/requests can improve media playback by reducing the delivery time for the fetched/requested segments due to the localization of CDN edge servers.

Figure 2:
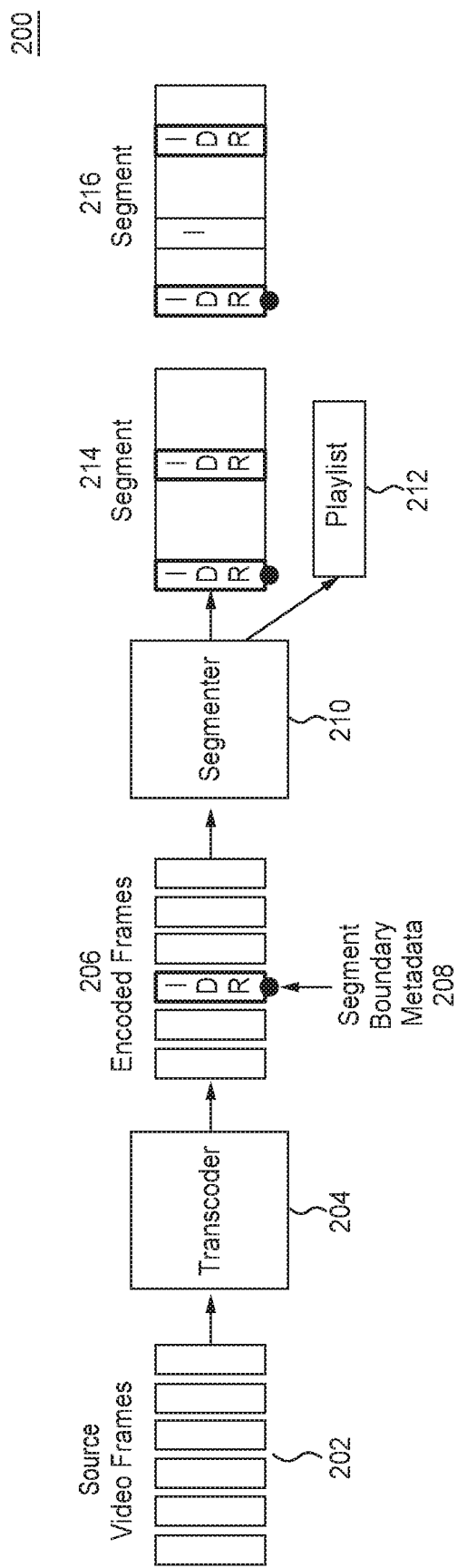
FIG. 2 illustrates a transcoder conditioning a video data stream for downstream segmentation, according to one embodiment.

FIG. 2 illustrates a transcoder conditioning a video data stream for downstream segmentation, according to one embodiment. In this embodiment, a transcoder 204 receives source video frames 202, and generates encoded frames 206 by encoding the source video frames 202 with an indicator demarcating selected IDR frames in the encoded frames 206 as segment boundaries. In this embodiment, the segment boundary indicator is in-band segment boundary metadata 208. A segmenter 210, downstream from the transcoder, only segments the encoded frames 206 at the IDR frames that have been demarcated as segment boundaries. In another embodiment, the transcoder 204 may insert IDR frames into the variant streams to force desired segment boundaries. A segmenter 201, downstream from the transcoder, segments the encoded frames 206 at each IDR frame of the encoded frames 206.

The transcoder 204 may be configured with a max GOP duration, a target segment duration, and a minimum/maximum segment duration. Creating segments with segment durations equal to the target segment duration is desired, but the segment durations may be modified to accommodate other occurrences such as advertisement breaks or chapter points.

A chapter point is a point of transition in the media content. For example, a chapter may indicate the beginning or end of an advertisement break, or a natural break in a conversation between characters in the media content. In one embodiment, chapters operate as segment boundaries. A chapter may occur at any location in the media playback, irrespective of the chapter's position relative to a non-chapter segment boundary.

A segmenter 210 or packager produces segment 1 214 and segment 2 216 by segmenting the encoded frames 206 at the demarcated IDR frames. The segmenter 210 also creates a playlist 212 that references segment 1 214 and segment 2 216 as resources accessible by a client device via the playlist 212.

Although segment 1 214 contains two IDR frames, both of which could have served as segment boundaries, the segmenter 210 only segmented at the demarcated IDR frame. Hence, segment 1 214 begins with a demarcated IDR frame. Similarly, segment 2 216 contains 2 IDR frames and one I-frame, any of which could have served as segment boundaries. However, because the segmenter 210 only segmented at the demarcated IDR frame, segment 2 216 begins with a demarcated IDR frame.

The unlabeled groupings of frames in segment 1 214 and segment 2 216 may be any combination of P-frames, B-frames, or both. Both segment 1 214 and segment 2 216 have equal segment durations, and both segments begin with an IDR frame. Although both segments contain two IDR frames, the second IDR frame in each segment was not demarcated as a segment boundary, and, thus, was not segmented by the segmenter 210 at that frame.

Figure 3A:
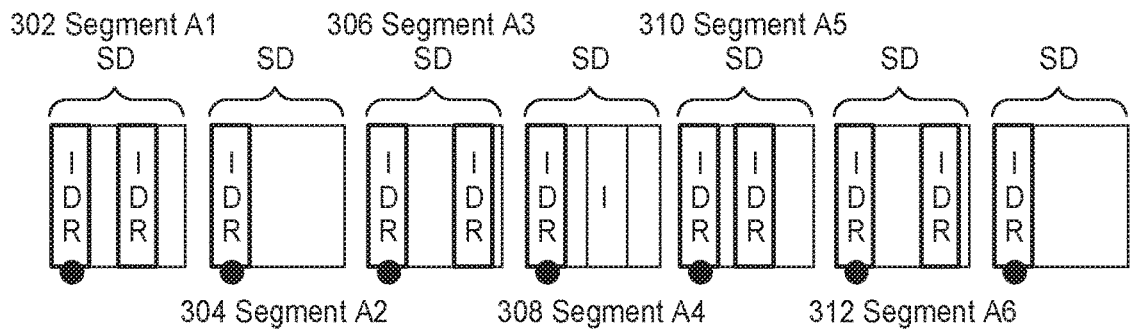
FIG. 3A illustrates a transcoder conditioning a video data stream for segment fluidity, according to one embodiment.

FIG. 3A illustrates a transcoder conditioning a video data stream for segment fluidity, according to one embodiment. In this embodiment, a transcoder conditions the video data stream to ensure that all variant streams have identical segment boundaries at the smallest desired segment-fluidity duration.

The transcoder conditions the video stream for segment fluidity by using a target segment duration (SD) equal to the minimum segment-fluidity duration (MinSFD). In one embodiment, the MinSFD is a platform-specific or media-player-specific shortest desired segment duration that allows segment boundaries to be aligned across all variant streams.

Each segment has the same, fixed segment duration, but the segmenter may group multiple segments to build a playlist with varying groups of segments. For example, if the MinSFD and matching SD span 2 seconds, then one playlist generated by the segmenter may first reference individual segments, such as segment A1 302, segment A2 304, and segment A3 306, and then reference a group of segments including segment A4 308, segment A5 310, and segment A6 312. Hence, in this example, the playlist begins with reference to three individual 2 second segments, followed by a reference to a group of segments spanning 6 seconds.

The variable grouping of segments enables the segmenter to generate a playlist that references segments with optimized durations for media playback on any given platform. In this manner, segment fluidity improves media playback performance on client devices implementing differing operating systems and media players.

For example, in one embodiment, the variable grouping of segments is used to provide shorter segment durations at media playback startup and seek points, while providing longer segment durations during parts of the media playback where an end-user is unlikely to initiate a start or seek operation. Therefore, the variable grouping may enable improved media playback for media players that perform well with short durations upon start up or seeking, while reducing the load on servers by switching to longer segments afterwards.

Figure 3B:
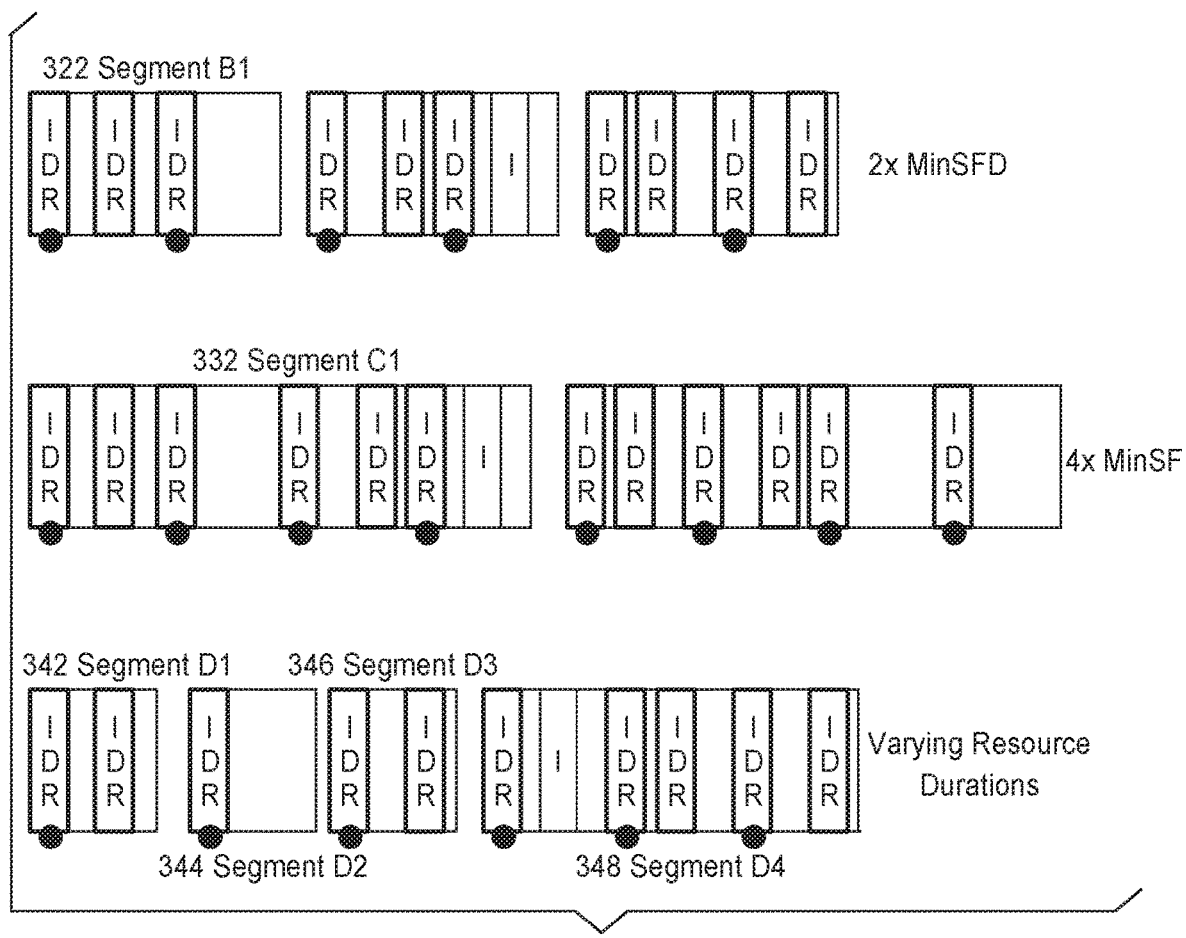
FIG. 3B illustrates configurations of segments resources of various durations, according to one embodiment.

FIG. 3B illustrates configurations of segments resources of various durations, according to one embodiment. In this embodiment, each segment grouping includes multiple segments with SDs matching the MinSFD.

Segment B1 322 represents a grouping of 2 SDs, each SD matching the MinSFD. Segment C1 332 represents a grouping of 4 SDs, each SD matching the MinSFD. Segment D1 342, segment D2 344, and segment D3 346 each represent one SD followed by segment D4, which represents a grouping of 3 SDs, each matching the MinSFD.

As depicted in these SD grouping variations, since each SD matching the MinSFD begins on an IDR frame, any SD grouping variation contains multiple IDR frames. For example, because segment B1 322 contains two SDs matching the MinSFD, segment B1 322 contains at least two IDR frames.

In addition to the IDR frames present in the segment grouping due to including multiple SDs that match the MinSFD, each segment may contain extra !-frames due to a angle detection feature of an encoder. Scene change detection occurs when the encoder detects a large difference between adjacent video frames in the video stream. Once the new scene is detected, the encoder inserts an I-frame to serve as a full picture containing all the video data of the new scene.

For example, segment C1 332 begins on an IDR frame. Suppose this beginning frame shows a red picture, followed by a P-frame or B-frame (unlabeled) that makes small changes to the red hue in a small portion of the video stream. Suppose the next frame shows a detailed picture of a rain-forest. The encoder detects this large change in scenery and encodes the rain-forest video data in an I-frame (here, an IDR frame). Thus, segment C1 332 now has an extra IDR frame that is not due to the SD matching the MinSFD.

The embodiments illustrated in FIGS. 3A and 3B are suboptimal because a video stream that includes a large number of I-frames may expose key-frame pulsing, which often occurs when the SD is less than 4 seconds. Keyframe pulsing may present as a pulsating video image seen during media playback.

Figure 3C:
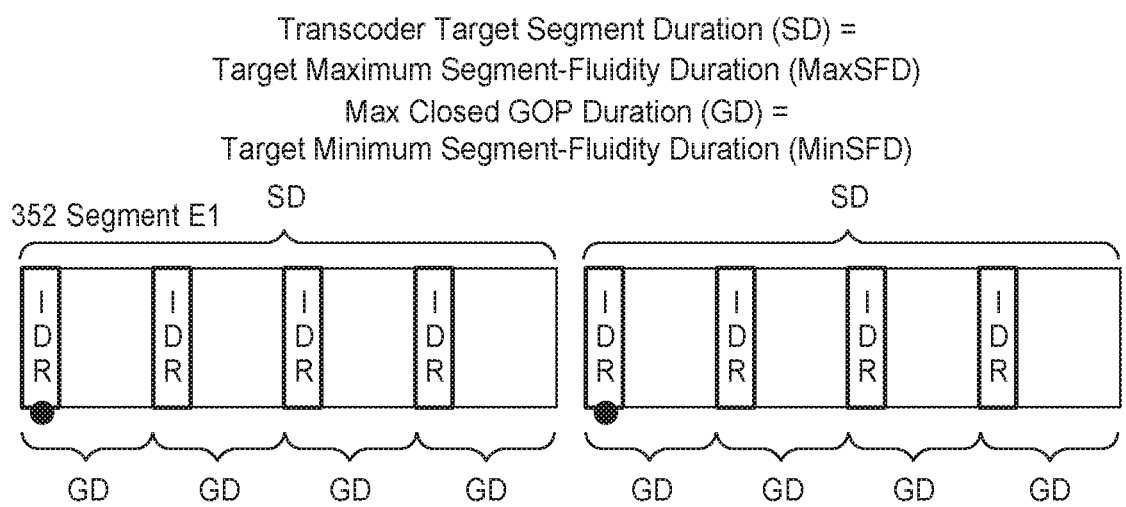
FIG. 3C illustrates a maximum GOP duration and target segment duration to reduce key frame pulsing, according to one embodiment.

FIG. 3C illustrates a maximum GOP duration and target segment duration to reduce key frame pulsing, according to one embodiment. In this embodiment, the solution to reduce key-frame pulsing is to configure the transcoder with an SD equal to the target maximum segment-fluidity duration (MaxSFD), and with a max GOP duration (GD) equal to the MinSFD. In one embodiment, the MaxSFD is the longest segment duration possible while keeping segment boundaries aligned across all variant streams.

For example, because the GD is equal to a set value, segment E1 352 includes equally sized GDs. If the GDs is large enough, key-frame pulsing can be reduced.

One possible drawback with the configuration in FIG. 3C is that scene change detection may disrupt GOP alignment across variant streams. GOP misalignment may occur because scene change detection occurs dynamically, and may trigger I-frame insertions at different frames in each variant stream corresponding to the same media content. When the encoder inserts an I-frame, the key-frame interval is reset, leading to GOPs that may be misaligned across variant streams.

Figure 4:
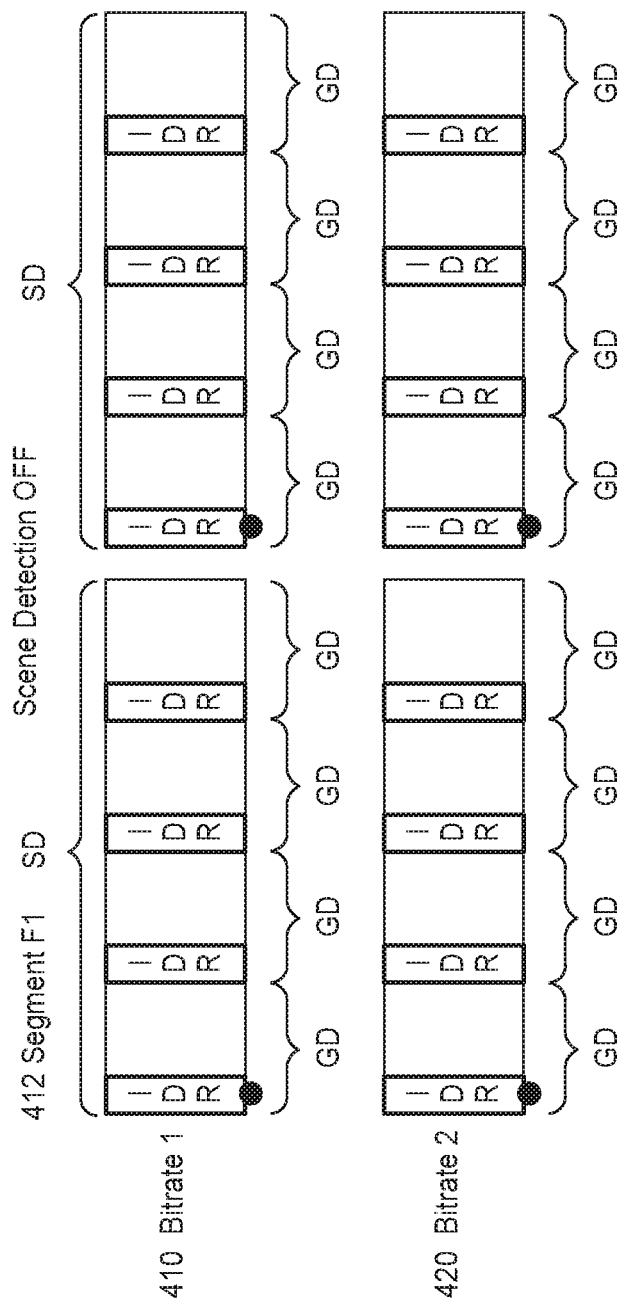
FIG. 4 illustrates variant streams conditioned for segment fluidity, according to one embodiment.

FIG. 4 illustrates variant streams conditioned for segment fluidity, according to one embodiment. In this embodiment, the variant streams represented by bitrate 1 410 and bitrate 2 420 are aligned across GOPs since scene change is disabled.

Disabling scene change detection prevents extra keyframes from being inserted into the variant streams. Therefore, the key-frame interval is never reset and the GDs remain at their original size. If the GDs are large enough, key-frame pulsing is minimized.

However, disabling scene change detection is undesirable because IDR frames may fall on non-ideal frames. For example, suppose there is a scene change at the start of a car chase in the video data. Suppose the scene change occurs between the $2^{nd}$ and $3^{rd}$ IDR frames in segment F1 412. With scene change detection disabled, the oncoming IDR frame is the third frame, which is placed after the start of the car chase. Hence, an end-user could not seek to the start of the car chase; the end-user could only seek to the $2^{nd}$ IDR frame, before the start of the car chase, or to the $3^{rd}$ IDR frame, after the start of the car chase.

Figure 5:
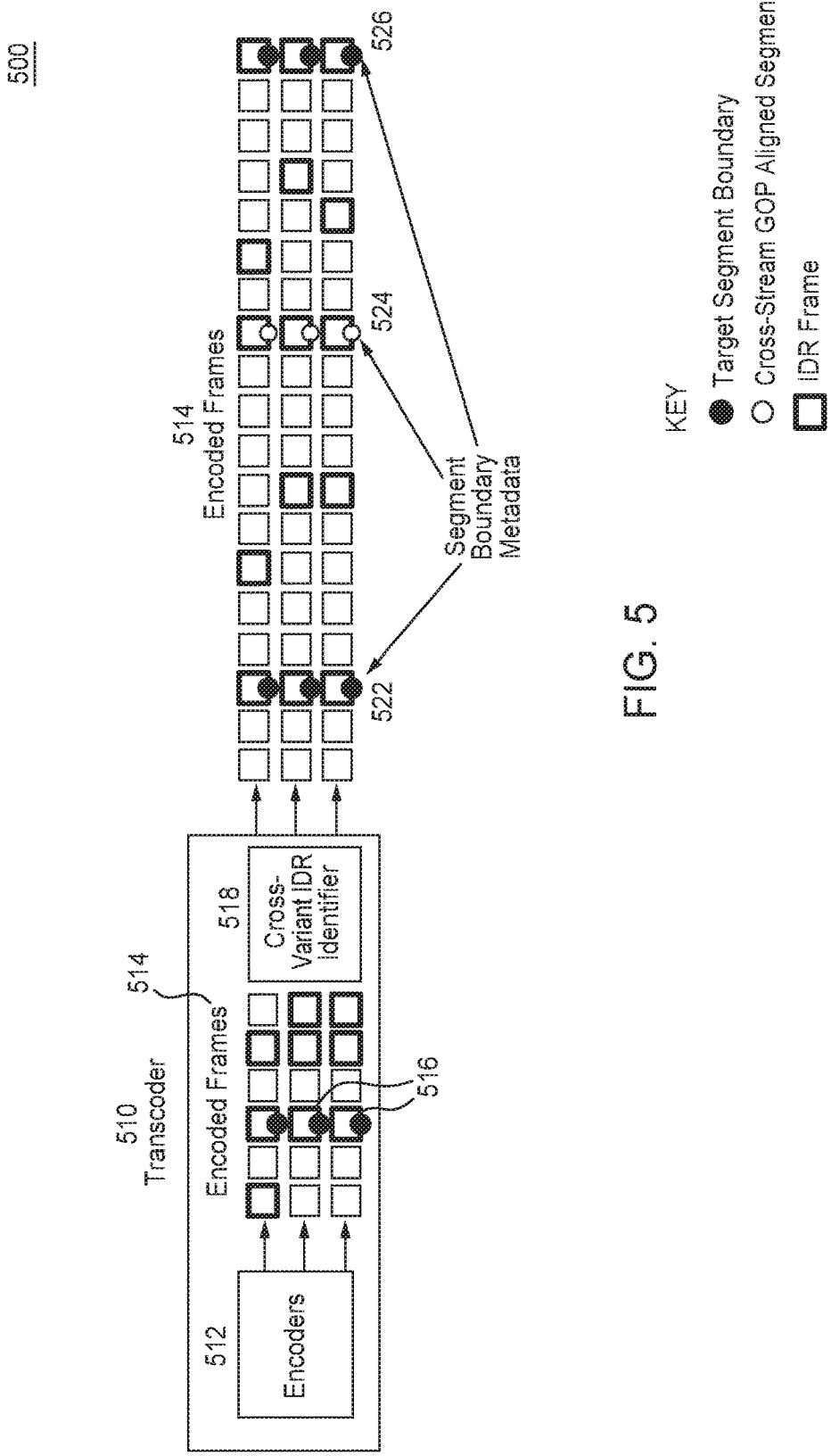
FIG. 5 illustrates a transcoder conditioning a video data stream for segment fluidity, according to one embodiment.
Figure 6:
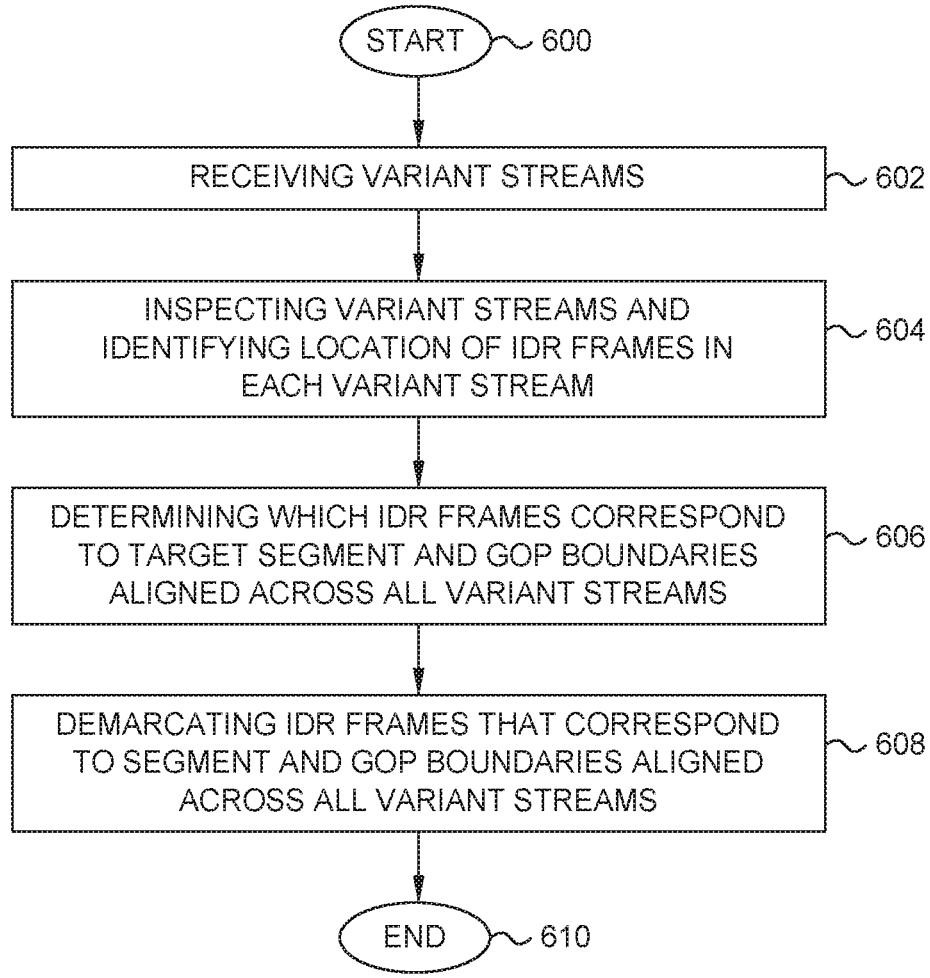
FIG. 6 illustrates a flowchart for operation of a cross-variant IDR identifier, according to one embodiment.

FIG. 5 illustrates a transcoder 510 conditioning a video data stream for segment fluidity, according to one embodiment. FIG. 6 illustrates a flowchart for operation of a cross-variant IDR identifier, according to one embodiment. For clarity, FIG. 5 is explained in conjunction with FIG. 6.

In one embodiment, the transcoder uses large segment durations and small GOP durations, while keeping scene change detection enabled. In this embodiment, a cross-variant IDR identifier is used to minimize key-frame pulsing and eliminate misaligned segments.

The transcoder 510 includes multiple encoders 512 that convert a video stream into multiple variant streams that include encoded frames 514. The encoded frames 514 represent video frames in the variant streams.

IDR frames in the variant streams are designated by bolded, outlined squares. A target segment boundary indicates an intended beginning video frame at the start of a segment that is aligned with segments containing the same media content across the variant streams. A target segment boundary across the variant streams is designated by filled circles. A cross-stream GOP aligned segment boundary indicates a video frame at the start of a closed GOP that is aligned with segments containing the same media content across the variant streams. Each cross-stream GOP aligned segment boundary is designated by an unfilled circle.

When generating the variant streams, each of the encoders 512 inserts IDR frames into its respective variant stream based on a dynamic assessment of scene changes occurring in the video data of that variant stream. The dynamic assessment of scene changes may not produce a uniform distribution of IDR frames across the variant streams.

At block 602, a cross-variant IDR identifier 518 receives the variant streams. The cross variant IDR identifier 518 is a software module executed on hardware (e.g., a processor and memory).

At block 604, the cross-variant IDR identifier 518 inspects the variant streams and identifies the location of IDR frames in each variant stream. That is, the cross-variant IDR identifier 518 can look within each segment of each variant stream to identify IDR frames.

At block 606, the cross-variant IDR identifier 518 determines which IDR frames correspond to the cross-variant aligned target segment boundary 522 and cross-variant aligned target segment boundary 526. Each variant stream contains an IDR frame at these target segment boundary locations, such that the IDR frames at these locations are aligned across variant streams. By contrast, if any variant stream has a non-IDR frame at these locations, then the cross-variant IDR identifier 518 can determine that the IDR frames at these locations in the other variant streams do not correspond to a cross-variant aligned target segment boundary.

In addition, based on the identification of IDR frames at location 524, the cross-variant IDR identifier 518 determines that the IDR frames also produce a cross-variant GOP aligned segment boundary 524. By contrast, if any frame at location 524 is not an IDR frame, then the cross-variant IDR identifier 518 can determine that the location 524 does not correspond to a cross-variant GOP aligned segment boundary.

The cross-variant IDR identifier 518 may identify other target segment boundaries and GOP aligned segment boundaries in a similar fashion. The cross-variant IDR identifier 518 can also determine which IDR frames were inserted due to scene change detection.

The determination of IDR frames that are cross-variant target aligned boundaries, in contrast to cross-variant GOP aligned (non-targeted) boundaries, allows the cross-variant IDR identifier 518 to demarcate the variant streams at desired (target) cross-variant boundaries. Hence, any IDR frames inserted into the variant streams due to scene change detection do not prevent switching between variant streams when implementing ABR. Therefore, ABR can be implemented with scene change detection enabled.

At block 608, the cross-variant IDR identifier 518 demarcates the target segment boundaries or GOP aligned segment boundaries identified at block 606. The cross-variant IDR identifier 518 may demarcate other cross-variant aligned target segment boundaries and cross-variant GOP aligned segment boundaries in a similar fashion. In one embodiment, the cross-variant IDR identifier 518 uses metadata to demarcate the boundaries for downstream segmenting.

The cross-variant IDR identifier 518 may be included in the transcoder 510, or may be an independent unit, or may be included in one or more segmenters. Irrespective of its location, the cross-variant IDR identifier 518 operates to identify potential segment boundaries or GOP alignment boundaries across variant streams.

Figure 7A:
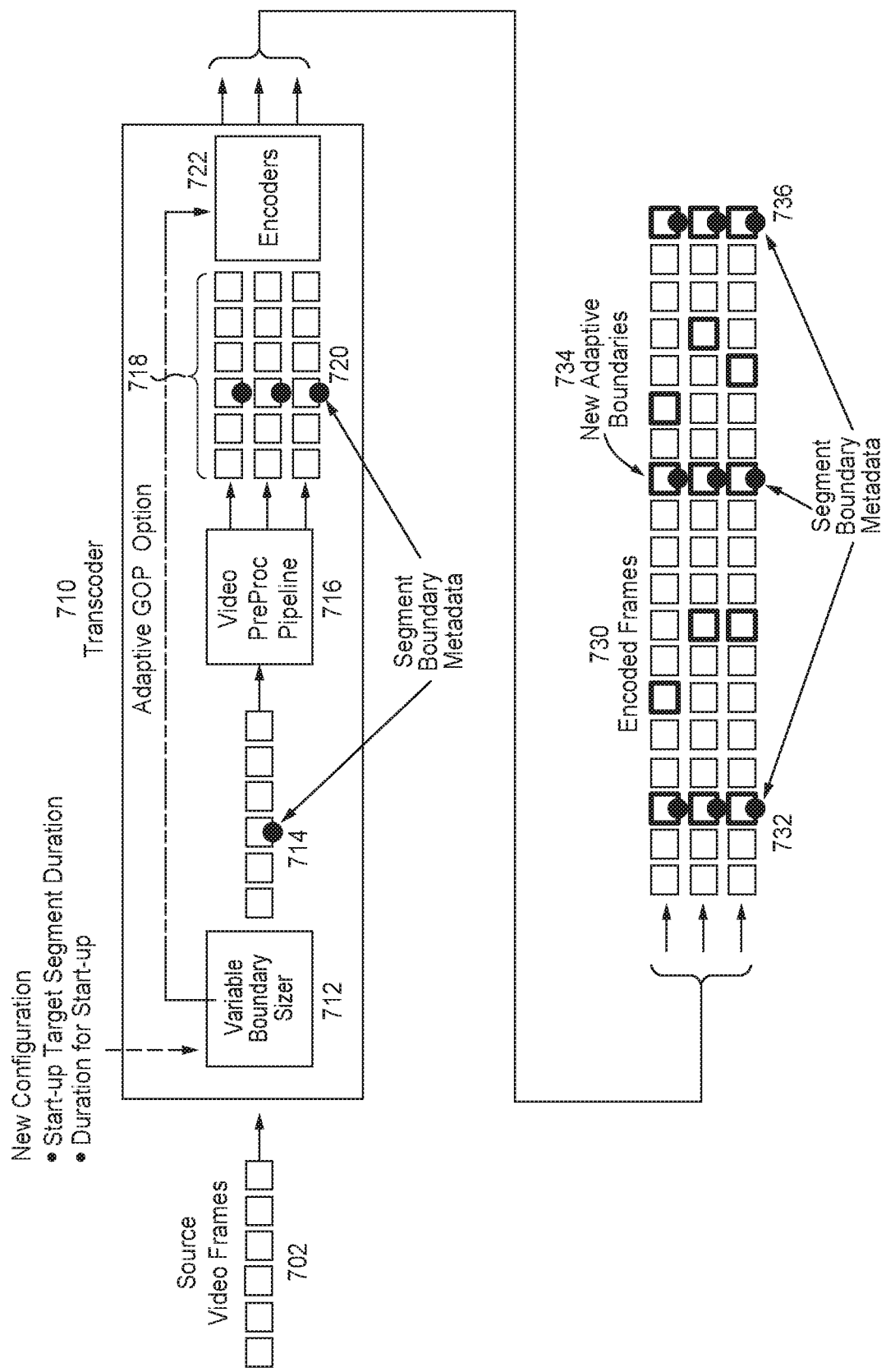
FIG. 7A illustrates a transcoder conditioning a video data stream for segment fluidity, according to one embodiment.
Figure 8:
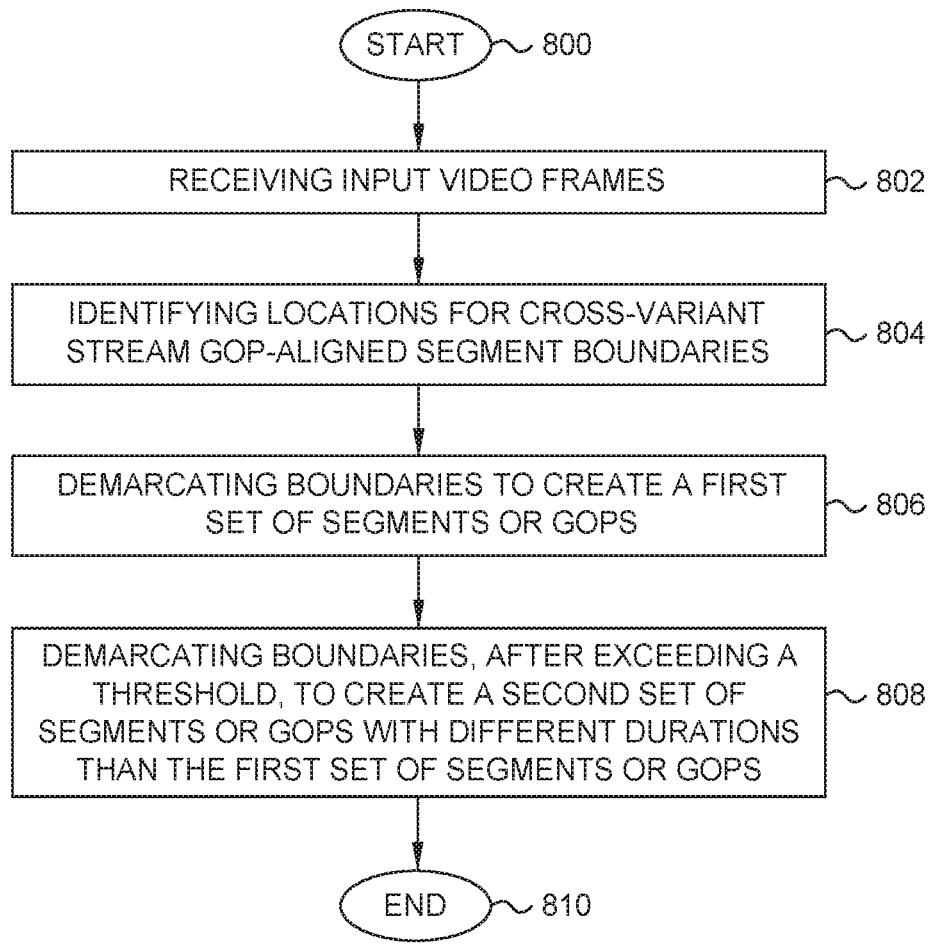
FIG. 8 illustrates a flowchart for operation of a variable boundary sizer, according to one embodiment.

FIG. 7A illustrates a transcoder conditioning a video data stream for segment fluidity, according to one embodiment. FIG. 8 illustrates a flowchart for operation of a variable boundary sizer, according to one embodiment. For clarity, FIG. 7A is explained in conjunction with FIG. 8.

In one embodiment, a variable boundary sizer conditions a video stream for short segments or short GOP durations at the startup, or at expected seek points, of media playback. Shorter segments or GOPs at these points may be desired because ABR allows media players to switch between variant stream boundaries designated by IDR frames. Since each segment or GOP begins with an IDR frame, the shorter segments provide the media player with multiple opportunities for variant switching, thereby allowing for quick adjustments to an optimal streaming quality immediately after a start/seek. This embodiment may extend the functionality of all embodiments disclosed herein.

A transcoder 710 includes a variable boundary sizer 712, which provides demarcations to make the encoders 722 of the transcoder 710 force IDR frames at the demarcations. At block 802, the variable boundary sizer 712 receives a video stream 702.

At block 804, variable boundary sizer 712 identifies locations for segment or GOP boundaries. These segments or GOPs may have a short, equal duration. For example, each segment may include a single GOP.

At block 806, the variable boundary sizer 712 demarcates segment boundaries for a first set of desired segments or GOP sizes in the video stream 702. In one embodiment, metadata is used to demarcate locations for IDR frames of desired segment or GOP boundaries in the video stream. When segmented downstream, the demarcated segment boundaries may be aligned across variant streams. Thus, the demarcated segment boundaries may operate as cross-variant boundaries for segments or GOPs.

The variable boundary sizer delivers the metadata to the encoders 722 directly or via a video pre-processor pipeline 716. In one embodiment, the metadata demarcates frames in a pre-processed video stream 714, which is transferred to a video pre-processor pipeline 716. The video pre-processor pipeline 716 is an optional component that may help in delivering one or more demarcated video streams 718 to the encoders 722 in formats optimal for the encoders 722.

The demarcations in the video stream may serve to create shorter segments or GOP sizes downstream. As mentioned above, shorter segments or GOPs at startup may be desired because ABR allows media players to switch between variant streams boundaries designated by IDR frames. Hence, short segments or GOPs, which begin with IDR frames, provide multiple opportunities for a media player to switch between variant streams. Therefore, irrespective of the streaming quality at which media playback begins, the media player has multiple opportunities to quickly switch to an optimal variant stream that is adequately supported by the available network bandwidth and data throughput of the client device.

Similarly, the time needed to achieve optimal playback performance may be reduced for client device media players that require a fixed amount of segments to be downloaded before switching to a different streaming quality, since the condition for switching can be satisfied at an early time during the media playback.

A similar reasoning exists for seek points. Unless the client device has access to a cache containing segments necessary for immediate media playback, a seek point operates like a starting point. Hence, seek operations share in the aforementioned benefits of short segments GOPs at the start of media playback.

At block 808, the variable boundary sizer 712 demarcates segment boundaries for a second set of desired segments or GOP sizes in the video stream 702. When segmented downstream, the demarcated segment boundaries may be aligned across variant streams. Thus, the demarcated segment boundaries may operate as cross-variant boundaries for segments or GOPs.

In one embodiment, the variable boundary sizer 712 may demarcate longer segments or GOPs after a threshold amount of shorter segments or GOPs have been demarcated. This threshold may, for example, be based on variant switching rules of a media player, such as a media player's requirement to download a given amount of segments or to download segments for a given amount of time before implementing ABR.

Once the amount of shorter segments or GOPs threshold is exceeded, the variable boundary sizer 712 may demarcate the video stream at larger segment boundaries and GOP sizes. Having larger segments and GOPs decreases the number of resource requests executed by the client device, thereby reducing required processing power from the client device and reducing the load on the server that is servicing the requests.

The variable boundary sizer 712 may make these demarcations at the beginning of media playback and at common or frequent-destination seek points, such as at chapter points.

Figure 7B:
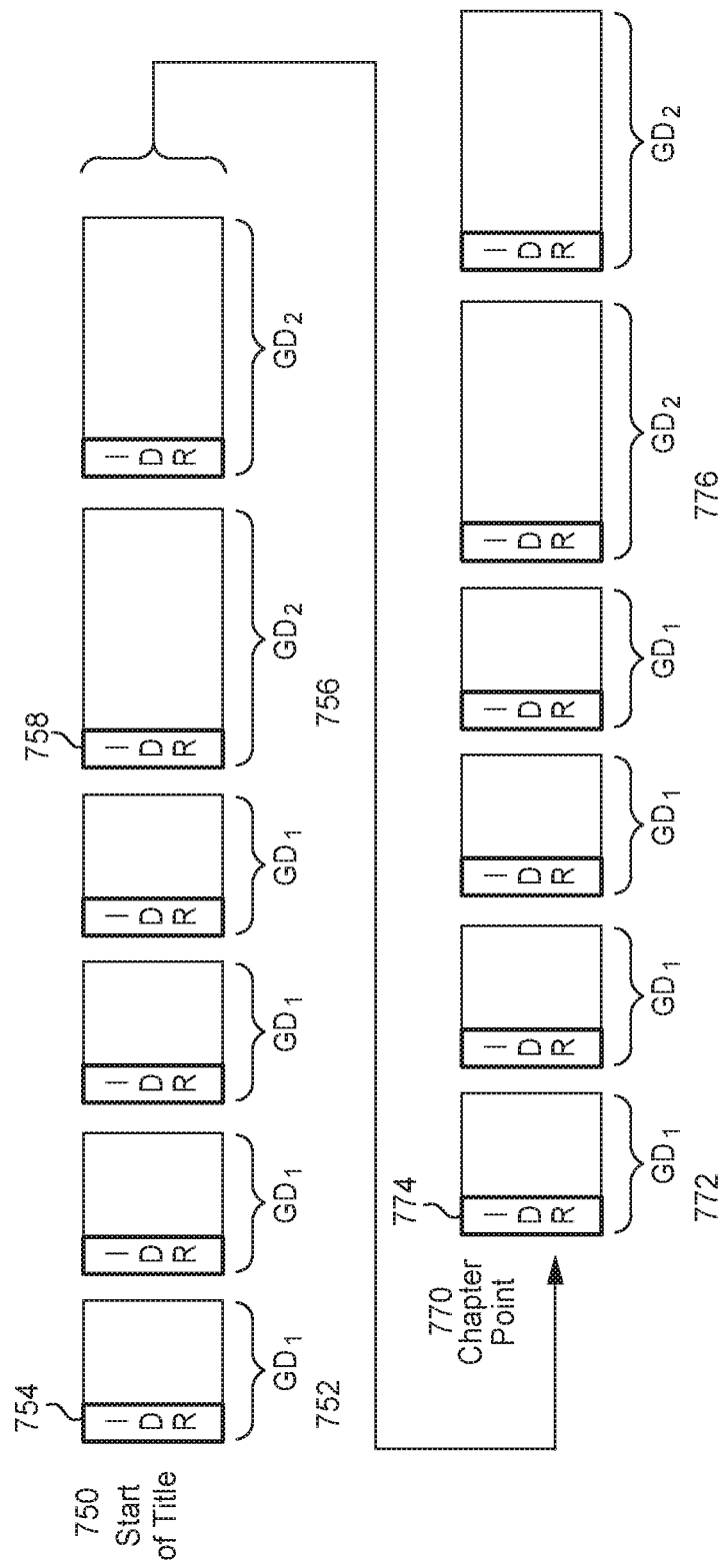
FIG. 7B illustrates segments and GOPs in a video data stream, according to one embodiment.

FIG. 7B illustrates segments and GOPs in a video data stream, according to one embodiment. In this embodiment, a segmenter output is shown for demarcations with shorter segments and GOPs at startup and the beginning of seek points, and for demarcations with longer segments and GOPs.

Shorter segments or GOPs are produced at the start 750 of the variant stream. These segments or GOPs are created by segmenting variant streams at demarcations that were established by an upstream variable boundary sizer. The segments and GOPs have an equal duration (e.g. 752). In one embodiment, each segment includes a single GOP, and each s segment or GOP begins with an IDR frame (e.g. 754).

In one embodiment, four segments or GOPs are demarcated before reaching the threshold. When the threshold has been exceeded, the segmenter produces longer segments (e.g. 756).

The combination of shorter segments or GOPs followed by longer segments or GOPs occurs at the start 750 of the variant stream, and at each expected seek point, such as a chapter point 770. This combination of short and longer segments and GOPs may improve media playback.

Having shorter segments or GOPs at startup is desired to give the media player multiple opportunities to quickly switch to an optimal variant stream that is adequately supported by the available network bandwidth and data throughput of the client device. Having larger segments and GOPs decreases the number of resource requests executed by the client device, thereby reducing required processing power from the client device and reducing the load on the server that is servicing the requests.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A or B it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
a plurality of encoders configured to generate a plurality of variant streams; and
a cross-variant Instantaneous Decoder Refresh (IDR) identifier configured to:
inspect the plurality of variant streams;
identify IDR frames in each of the plurality of variant streams;
determine a first set of the IDR frames that correspond to a respective cross-variant boundary;

determine a second set of the IDR frames within the cross-variant boundary; and demarcate the second set of the IDR frames.

2. The system of claim 1, wherein the first set of the IDR frames comprise a cross-variant target segment boundary indicating an intended beginning video frame at a start of a segment that is aligned with segments containing a same media content across the variant streams.

3. The system of claim 2, wherein the first set of the IDR frames is demarcated at the cross-variant target segment boundary.

4. The system of claim 1, wherein the second set of the IDR frames comprises a cross-variant Group of Pictures (GOP) aligned segment boundary indicating a beginning video frame at a start of a closed GOP that is aligned with beginning video frames at a start of a set of closed GOPs containing a same media content across the variant streams.

5. The system of claim 1, wherein the cross-variant IDR identifier is further configured to:

determine which IDR frames of the second set correspond to IDR frames inserted due to scene change detection; and operate to not demarcate the IDR frames corresponding to IDR frames inserted due to scene change detection.

6. The system of claim 1, wherein determining the second set of the IDR frames comprises identifying whether the second set of the IDR frames is aligned at respective video frame locations across all of the plurality of variant streams.

7. A non-transitory computer-readable medium containing computer program code that, when executed by operation of one or more computer processors, performs an operation comprising:

inspecting a plurality of variant streams;

identifying Instantaneous Decoder Refresh (IDR) frames in each variant stream;

determining a first set of the IDR frames that correspond to a respective cross-variant boundary;

determining a second set of the IDR frames within the cross-variant boundary; and demarcating the second set of the IDR frames.

8. The non-transitory computer-readable medium of claim 7, wherein the first set of the IDR frames comprise a cross-variant target segment boundary indicating an intended beginning video frame at a start of a segment that is aligned with segments containing a same media content across the variant streams.

9. The non-transitory computer-readable medium of claim 8, wherein the first set of the IDR frames is demarcated at the cross-variant target segment boundary.

10. The non-transitory computer-readable medium of claim 7, wherein the second set of the IDR frames comprises a cross-variant Group of Pictures (GOP) aligned segment boundary indicating a beginning video frame at a start of a closed GOP that is aligned with beginning video frames at a start of a set of closed GOPs containing a same media content across the variant streams.

11. The non-transitory computer-readable medium of claim 7, the operation further comprising:

determining which IDR frames of the second set correspond to IDR frames inserted due to scene change detection; and operating to not demarcate the IDR frames corresponding to IDR frames inserted due to scene change detection.

12. The non-transitory computer-readable medium of claim 7, wherein determining the second set of the IDR frames comprises identifying whether the second set of the IDR frames is aligned at respective video frame locations across all of the plurality of variant streams.

13. The non-transitory computer-readable medium of claim 7, wherein the operation is performed by a cross-variant IDR identifier integrated into a packager.

14. A method, comprising:

receiving a video stream;

identifying locations for boundaries of the video stream;

demarcating a first set of the boundaries to create a first set of segments; and demarcating a second set of the boundaries, after exceeding a threshold, to create a second set of segments that have different durations than the first set of segments.

15. The method of claim 14, wherein the first set of segments is demarcated at a location corresponding to at least one of a beginning of the video stream, a seek point, or a chapter point.

16. The method of claim 14, wherein each segment comprises at least one GOP.

17. The method of claim 14, wherein all segments in the first set of segments have an equal duration, and wherein all segments in the second set of segments have an equal duration.

18. The method of claim 14, wherein a duration of each segment in the second set of segments is longer than each segment in the first set of segments.

* * * * *

UNITED STATES PATENT AND TRADEMARK OFFICE
CERTIFICATE OF CORRECTION

PATENT NO. : 11,128,688 B2  
APPLICATION NO. : 16/654761  
DATED : September 21, 2021  
INVENTOR(S) : Scott C. Labrozzi et al.

Page 1 of 1

It is certified that error appears in the above-identified patent and that said Letters Patent is hereby corrected as shown below:

On the Title Page

Item (56), in Column 2, under "Other Publications", Line 3, delete "etreams" and insert -- streams --, therefor.

In the Specification

In Column 2, Line 57, delete "!-frame" and insert -- I-frame --, therefor.

In Column 6, Line 66, delete "!-frames" and insert -- I-frames --, therefor.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*